Sept. 18, 1973  D. KLEIST ET AL  3,759,680
METHOD AND APPARATUS FOR PRODUCING FIBERS FROM GLASS
Filed Sept. 14, 1970  3 Sheets-Sheet 3

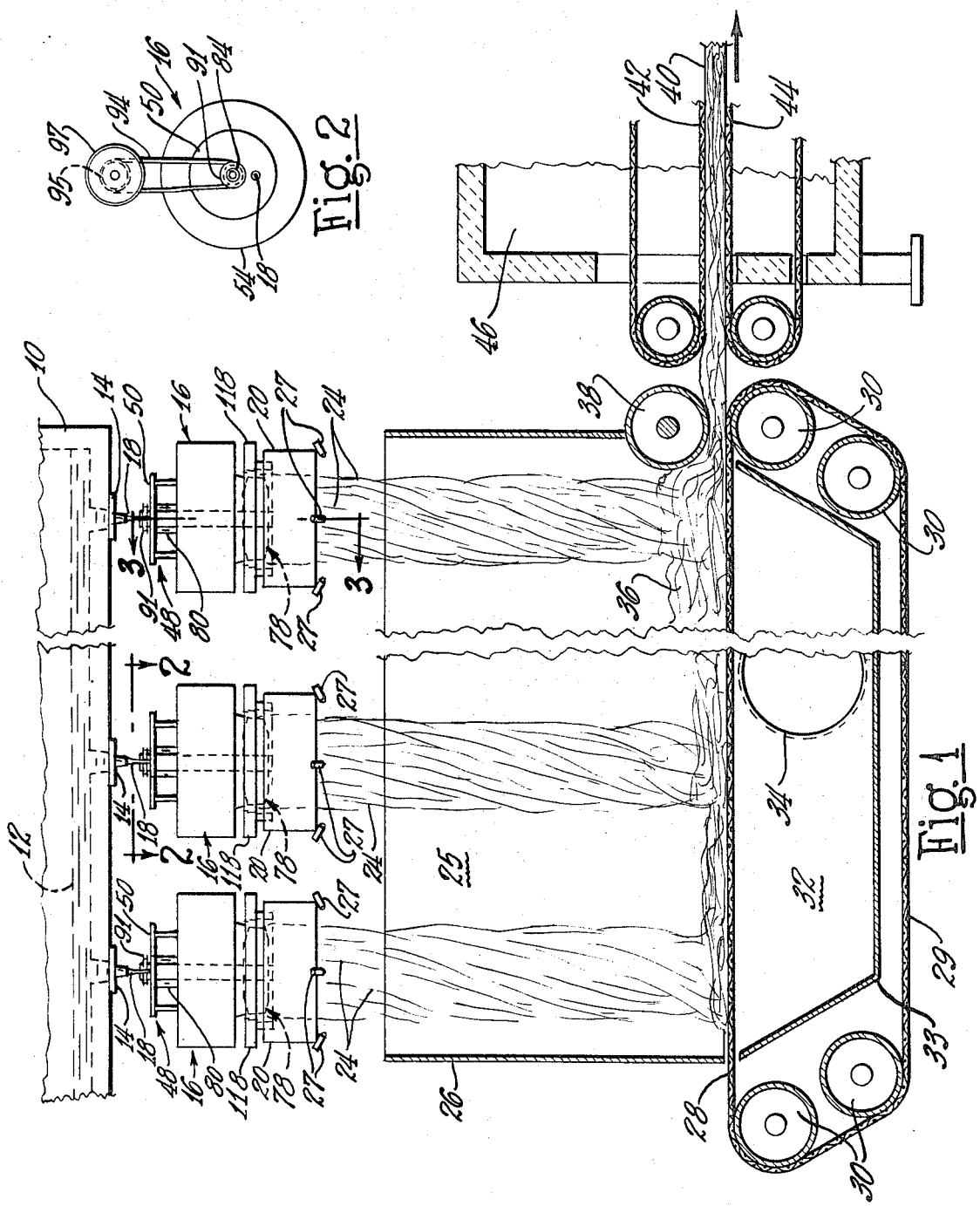

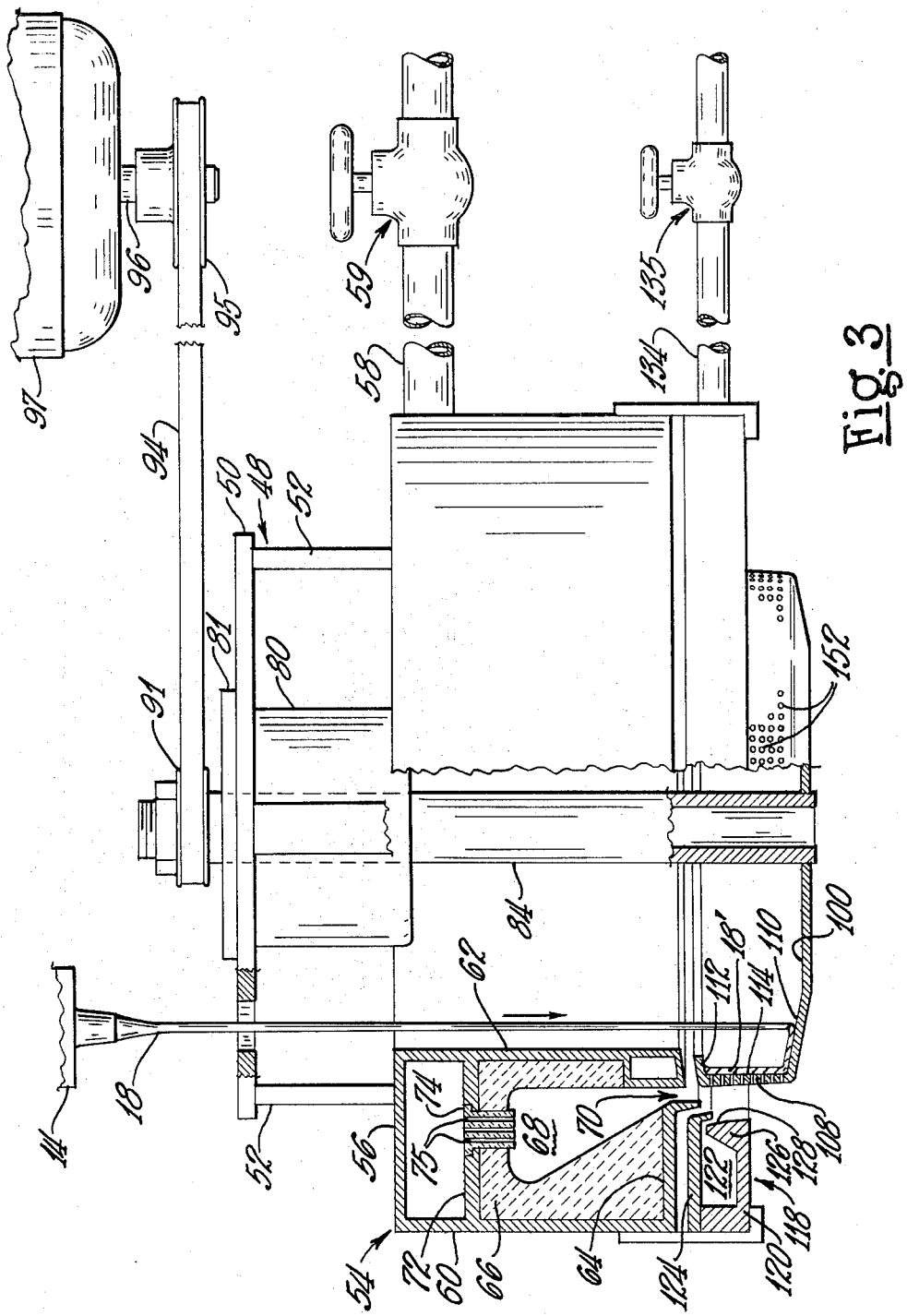

INVENTORS
DALE KLEIST &
CARL S. BUCHANAN

BY Staelin & Overman
ATTORNEYS

United States Patent Office 3,759,680
Patented Sept. 18, 1973

3,759,680
METHOD AND APPARATUS FOR PRODUCING
FIBERS FROM GLASS
Dale Kleist, St. Louisville, and Carl S. Buchanan, Newark,
Ohio, assignors to Owens-Corning Fiberglas Corporation
Filed Sept. 14, 1970, Ser. No. 71,707
Int. Cl. C03b 37/04, 37/06
U.S. Cl. 65—6
12 Claims

ABSTRACT OF THE DISCLOSURE

The disclosure embraces a method of and apparatus for producing fibers from heat-softenable materials, particularly glass, by centrifuging streams of heat-softened glass delivered through passages of equal diameters, differing lengths and differing flow resistances in the peripheral wall of a rotating spinner into a gaseous attenuating blast and establishing high temperature and other environmental conditions achieving relationship between glass flow of the streams and heat and attenuating energy at different regions with respect to the spinner wall to control the range of size or diameters of the fibers attenuated by the blast and for producing fibers of substantially uniform diameters within a comparatively narrow size range.

---

The invention relates to a method of and apparatus for producing attenuated fibers from heat-softened material wherein centrifuged streams of the material are attenuated to fibers in an environment and under conditions wherein the bulk or large proportions of the attenuated fibers produced are of diameters within a narrow size range.

In rotary processes heretofore used in producing glass fibers, the spinner employed is of a character in which the orificed peripheral wall of the spinner is of uniform thickness. In such processes, it has been a practice to deliver heat from an annular combustion burner downwardly along the spinner wall to replace heat loss from the glass, a condition resulting in a wide temperature differential at the stream delivery region of the spinner. By reason of the high gradient of temperature along the spinner wall, the centrifuged streams or primary filaments projected from the passages in different regions of the spinner wall are of varying characteristics, and the diameters of the fibers attenuated from the streams vary over a broad range because of lack of control of the characteristics of the streams and other variable environmental factors.

It has been conventional practice in rotary processes to deliver heat-softened glass into a distributor means disposed within a centrifuge or spinner from which streams of the glass are impinged by centrifugal forces onto the spinner wall and the glass projected from the spinner through passages as streams or primary filaments into a gaseous attenuating blast. The glass distributing means or "basket" within the spinner subdivides the molten glass into discrete streams which, during their traverse from the distributor means to the spinner wall, lose a substantial amount of heat thereby increasing the viscosity of the glass resulting in centrifugal streams of widely varying characteristics and no control of the size or characteristics of the fibers attenuated from the streams. In processes employing a glass distributing means within the spinner, it is found that substantially greater wear of the passages at the upper region of the spinner wall is encountered as compared with the wear of the passages in the lower region, this condition being another factor aggravating the wide differential in diameters of the attenuated fibers.

The present invention embraces a method of and apparatus for processing heat-softened material in forming centrifuged streams of the material delivered from passages in a spinner into a gaseous attenuating blast under temperature and environmental conditions achieving a relationship between the flow of glass of the streams and energy at the regions of the streams to control the range of diameters of the fibers attenuated from the streams by the blast whereby the production of fibers of diameters within a comparatively narrow size range is attained.

Another object of the invention embraces a method involving flowing heat-softened mineral material, such as glass, into a rotating spinner and along a spinner wall having stream delivery passages of differing resistances to flow with the hotter glass flowing from the passages of higher resistances and wherein the rates of flow of glass from the passages are controlled so that fibers attenuated from the streams from all of the passages are of diameters within a narrow range.

Another object of the invention resides in an arrangement for processing heat-softened material providing centrifuged streams of the material delivered from passages in a spinner wall into a gaseous attenuating blast wherein a stream of the material from a supply is delivered onto an imperforate surface of the spinner and conveyed by centrifugal forces to the wall region from which the streams are projected, and heat applied to the stream delivery region under conditions wherein the heating effect is greatest at a zone of delivery of streams most remote from the imperforate surface and the heat conducted to the imperforate surface through the spinner wall so that the wall temperature tends to be more uniform throughout the stream delivery region.

Another object of the invention resides in an arrangement for processing heat-softened mineral material, such as glass, wherein a stream of heat-softened material is delivered onto an imperforate bottom of a rotating spinner having a peripheral wall provided with stream flow passages and the glass conveyed along a frusto-conical or inclined surface of the imperforate bottom to the spinner wall thereby facilitating uninterrupted flow of glass to the wall with a minimum of heat losses.

Another object of the invention embraces a method of and arrangement for processing heat-softened material, such as glass, utilizing a rotating spinner for delivering primary filaments or streams into an attenuating region of substantial area and wherein the temperature in the region or the energy of the attenuating media may vary from one part of the region to another part, and the flow resistances of the stream delivery passages in the spinner selected to provide for the diminishing attenuating energy of the blast downwardly of the spinner so that the rates of flow of glass from the passages or orifices in the spinner wall are correlated with the downwardly decreasing heat energy and the downwardly diminishing attenuating energy whereby the attenuated fibers are of more uniform diameters, and the products embodying the fibers endowed with improved strength and insulating characteristics and other advantageous properties.

Another object of the invention is the incorporation into the spinner wall of passages of differing flow resistance characteristics providing compensation for the non-uniform temperature environment and the downwardly diminishing attenuating energy of the blast whereby a flow resistance pattern is provided for the glass moving through the passages matched to the varying ambient temperature and the varying attenuating energy whereby the centrifuged glass streams are attenuated to fibers of diameters within a more narrow size range or band than has heretofore been attainable.

A further object of the invention resides in a method of processing heat-softened glass by centrifuging streams of the glass under conditions wherein the streams are attenuated to fibers of diameters within a narrow size range wherein added heat for the environment at the centrifuge is reduced and the velocity of the attenuating blast is reduced, resulting in less turbulence in the fiberizing zone and hence less abrasion of the fibers.

Another object of the invention resides in a hollow spinner having an imperforate bottom and glass flow passages of uniform diameters in its peripheral wall wherein the spinner wall varies in thickness providing passages of differing lengths with the passages of shorter lengths adjacent the juncture of the spinner wall with the imperforate bottom to promote the formation of centrifuged streams for attenuation to fibers of diameters within a comparatively narrow range.

Further objects and advantages are within the scope of this invention such as related to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 1 illustrates a group or series of fiber forming units embodying the invention wherein the fibers from the units are collected to form a fibrous mass;

FIG. 2 is a sectional view taken substantially on the line 2—2 of FIG. 1 showing the method of driving a spinner of a fiber forming unit;

FIG. 3 is a vertical sectional view of one of the fiber forming units of the invention, the view being taken substantially on the line 3—3 of FIG. 1;

Figure 4:
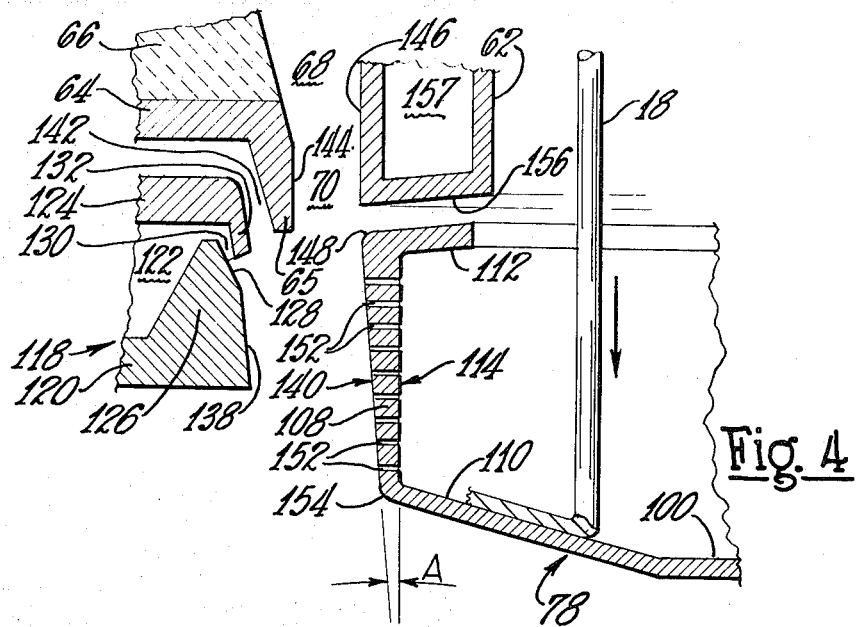
FIG. 4 is an enlarged view of a portion of the fiber forming unit shown in FIG. 3.

While the method and arrangement of the invention are particularly usable for forming fibers of glass, it is to be understood that the method and apparatus may be used to form fibers from other heat-softenable mineral materials such as fusible rock, slag or similar materials.

Referring to the drawings in detail and initially to FIG. 1, there is illustrated a series or group of fiber forming instrumentalities or units embodying the invention, the instrumentalities or units being disposed so that the attenuated fibers are collected on a moving conveyor or in any other suitable manner. The arrangement includes a forehearth 10 connected with a suitable melting and refining furnace (not shown) in which glass batch or other fiber forming mineral material is reduced to flowable or molten condition by the application of heat in a conventional manner.

The heat-softened or molten glass flows from the furnace through the conventional channel 12 in the forehearth 10 providing a supply of heat-softened glass for several fiber forming instrumentalities or units. In the embodiment illustrated, three fiber forming units are disposed beneath the foreheath 10 in spaced relation lengthwise of the forehearth, it being understood that a lesser or greater number of units may be employed with a single forehearth.

Disposed beneath and secured to the forehearth are spaced stream feeders or bushings 14, each of the feeders being arranged to deliver a stream of glass and each fiber forming unit or instrumentality 16 is disposed to receive a stream of glass 18 from an adjacent feeder 14, each unit or instrumentality 16 embodying the invention for forming or processing the glass of the stream 18 into discrete bodies, primary filaments or small streams by centrifuging the heat-softened glass from a hollow spinner, the bodies, primary filaments or small streams being attenuated to fibers by an annularly-shaped gaseous blast.

The fiber forming units 16 are supported by conventional frame means (not shown). The fiber attenuating region of each of the fiber forming units is surrounded by a thin walled cylindrically-shaped guard member 20. In the embodiment illustrated, the attenuated fibers 24 are delivered from the fiber forming units into a chamber 25 provided by a forming hood 26. A plurality of nozzles 27 may be supported by the guard member 20 for delivering binder or other material onto the fibers 24. Disposed at the base or lower end of the forming hood 26 is the upper flight 28 of a conveyor 29, preferably of the endless belt type, the fibers moving downwardly under the influence of the gases of the attenuating blasts and by gravity onto the conveyor flight 28.

The conveyor 29 is supported by a plurality of rolls 30, one of the rolls being driven by conventional motive means (not shown) to advance the flight 28 of the conveyor in a right-hand direction. Arranged beneath the upper flight 28 of the conveyor in registration with the chamber 25 is a suction chamber 32 provided by a receptacle 33. The chamber 32 is connected by a pipe 34 with a suction blower (not shown) of conventional connection for establishing subatmospheric or reduced pressure in the chamber 32.

The subatmospheric or reduced pressure in the chamber 32 assists in the collection of the fibers 24 upon the conveyor flight 28, the suction action provided by the reduced pressure conveying away the spent gases of the attenuating blasts. The fibers 24 accumulate in a mass 36 which is advanced by the conveyor flight 28 beneath a sizing roll 38 which compresses the mass of fibers into a mat 40. In the embodiment illustrated, the mat 40 of compressed, binder impregnated fibers is advanced by endless belts 42 and 44 through an oven or curing chamber 46 in which the binder or adhesive on the fibers is set or cured by the application of heat and circulating air in the oven in a well known manner.

FIG. 3 illustrates in partial cross section the components of the fiber forming unit or instrumentality of the invention which components include a hollow spinner or rotor, a burner providing a heated environment for the primary filaments or centrifuged streams of glass and means for delivering a gaseous blast into engagement with primary filaments or small streams of glass for attenuating the primary filaments or streams to fibers.

The fiber forming unit or instrumentality 16, as illustrated in FIG. 3, is inclusive of a support means or supplemental frame 48 which, in turn, is supported by a main frame (not shown) of conventional construction.

The support means 48 includes a horizontally disposed plate or member 50 mounted by a plurality of strut members 52 secured to the plate 50. Secured to the members 52 is an annular combustion burner construction 54. The burner construction includes an annularly-shaped manifold 56 provided with an inlet tube 58 for connection with a supply of fuel and air mixture for delivery to the burner. Conventional value means 59 is connected with the inlet tube 58 to control delivery of combustible mixture into the annular chamber or manifold 56.

The burner construction includes an outer circular wall 60 and an inner circular wall 62 and a base or lower plate 64, these components being fashioned of metal. The walls 60 and 62 are lined interiorly with high temperature resistant refractory 66 shaped or configured to provide an annular confined combustion zone or chamber 68 having an annular throat or discharge passage 70 through which flames or hot gases of combustion from the chamber 68 are delivered to provide a heated environment for the primary filaments or small streams centrifuged from orifices or flow passages in the spinner wall.

An upper substantially horizontal wall 72 of the burner construction is fashioned with circumferentially spaced openings accommodating fittings 74, each fitting having a plurality of comparatively small passages 75 through which combustible mixture from the manifold 56 is delivered under comparatively low pressure into the combustion chamber 68, the small passages 75 forming a fire screen means to avoid ignition of the mixture in the manifold 56. The position of the throat 70 for the chamber 68 and its relation to the spinner or hollow body will be hereinafter described.

The rotatable hollow body, rotor or spinner 78 and its support and driving means are illustrated in FIG. 3, the driving means being also shown in FIG. 2. Mounted by the frame member 50 is a stationary housing means 80 provided with a central hollow region accommodating a tubular member, shaft or quill 84, the shaft 84 in the embodiment illustrated being rotatable about a vertical axis. Disposed in the housing means 80 are bearing means journally supporting the tubular member or shaft 84. As shown in FIGS. 2 and 3, driving means is provided for rotating the shaft 84 and the spinner 78 comprising a sheave or pulley 91 secured on shaft 84, the sheave 91 being engaged by a driving belt or driving means 94 which is engaged with a sheave or pulley 95 mounted upon a shaft 96 of an electrically energizable motor 97.

Secured to or mounted by an end region of the quill or shaft 84 in the hollow spinner, rotor or centrifuge 78 being closed at one end by an imperforate bottom or floor of generally saucer shape comprising portions 100 and 110. In the form shown in FIGS. 3 and 4, the spinner 78 is fashioned with a peripheral wall 108 integrally joined with an annular frusto-conical shaped or upwardly and outwardly inclined section or portion 110 integral with the central planar bottom portion 100 of the spinner. The inclined section or annular ramp provided by the portion 110 tends to resist warpage under the influence of heat and centrifugal forces. Thus, the glass flows along the shorter path provided by the upwardly inclined annular ramp portion 110 of the spinner bottom to the inner surface of the spinner wall 108, the inclined ramp reducing the abruptness of engagement of the glass with the spinner wall.

Integrally joined with the upper peripheral region of the spinner wall 108 is an inwardly-extending narrow circular flange 112 defining an open end of the spinner, the flange reinforcing the spinner wall to prevent or minimize warpage.

As illustrated in FIGS. 3 and 4, the inner peripheral surface 114 of the spinner wall 108 is preferably substantially cylindrical in shape with its axis coincident with the axis of the shaft or quill 84. With the surface 114 of substantially cylindrical shape, the heat-softened or molten glass or other mineral material, maintained along this surface under the influence of centrifugal forces, will be of substantially the same thickness throughout the vertical region of the spinner wall 108.

The heat-softened or molten glass is delivered from a supply in the form of the stream or body 18 onto the imperforate frusto-conically shaped ramp portion 110 of the spinner floor or bottom, the glass of the stream, as a film connected with the stream, flows upwardly along the inclined ramp 110 and along the interior peripheral wall 114 of the spinner. By maintaining the glass of the film on the ramp surface 110 and that on the interior spinner wall surface 114 integrated with the glass of the stream 18, there is a minimum of exposed surface area of the glass and hence heat losses are reduced to a minimum.

Surrounding the spinner construction 78 is a blower construction 118 which is inclusive of an annularly-shaped member 120 configurated to provide an annular manifold or chamber 122, a top plate or cover 124 being secured by suitable means (not shown) to the member 120. The manifold member 120, shown in FIGS. 3 and 4, is fashioned with an upwardly extending circular wall or skirt portion 126 having a first upwardly and outwardly flaring or frusto-conically shaped surface 128 which has a raised portion fashioned with a plurality of circumferentially spaced slot or orifice 130.

The cover member 124 has a downwardly extending circular lip portion 132 overlying the raised portion defining the slots 130 to form an upper wall of each of the slots. The manifold or chamber 122 is supplied with gas under pressure, such as compressed air or steam, from a supply through a tubular member 134. The compressed air or steam in the manifold chamber 122 is delivered through the slots 130 providing a high velocity gaseous fiber-attenuating blast. A valve 135 is connected with the tube or pipe 134 for regulating the admission of steam or air under pressure to the blower manifold chamber 122 to control the velocity of the fiber-attenuating blast.

A second downwardly and inwardly inclined or frusto-conically shaped surface 138 is fashioned on the blower skirt or wall 126. The downwardly and inwardly inclined annular surface 138 directs the gases of the blast toward the lower peripheral wall region of the exterior surface 140 of the spinner wall, the gases of the blast from the slots 130 engaging primary filaments or streams of glass delifered through small orifices or passages in the spinner wall 108 to attenuate the streams or primary filaments to fibers.

A depending skirt portion 65 of the burner plate 64 is spaced from the cover 124 of the blower construction providing a restricted annular passage 142 through which air induced by the velocity of the blast is admitted to the blast. The taper or angularity of the surface 128 of the wall 126 of the blower construction with respect to the axis of rotation of the spinner may be in a range of from ten to fifteen degrees.

The annular throat 70 through which intensely hot burned gases from the burner chamber 68 are projected is defined by an outer annular surface 144 and an inner annular surface 146. The inner surface 146, in the embodiment illustrated in FIGS. 3 and 4, is in substantially vertical alignment with the upper peripheral edge 148 of the spinner section. Through the arrangement of substantially vertical alignment of the inner circular surface 146 of the throat 70 with the upper edge 148 of the spinner, the flames or intensely hot gases from the combustion chamber 68 have brushing contact with and along the exterior surface 140 of the spinner so as not to excessively heat the inwardly extending upper flange 112. Thus, substantially all of the heat provided by the hot gases or flames from the chamber 68 flows downwardly along the exterior peripheral surface 140 of the spinner wall 108 or is conducted by the spinner wall through the floor portions to the shaft 84 joined with the closed end of the spinner.

All of the flow passages 152 in the spinner wall 108 are preferably of uniform diameters but of varying lengths providing varying resistances to flow of the heat-softened glass from the lowermost passages to the uppermost passages in the spinner wall. This factor, in cooperation with other environmental characteristics, promote the flow of glass through the passages in amounts which, when attenuated into discrete fibers by the attenuating blast, result in the bulk or a large proportion of the collected fibers being of diameters within a very narrow size range with the remainder of fibers of larger or smaller diameters than those of the bulk. It is found that the diameter of the flow passages 152 may be in a range of from twenty-nine thousandths of an inch to thirty-nine thousandths of an inch depending upon such characteristics as the temperature and composition of the glass and the size range of fibers to be produced.

In the form of apparatus shown in FIGS. 3 and 4 for carrying out the method of the invention, the varying resistances to flow of the passages or orifices 152 in the spinner wall 108 are attained by fashioning passages of varying lengths. In the embodiment illustrated, the varying lengths of passages 152 are provided by the converging surfaces 114 and 140, providing the varying thickness of the spinner wall 108 from its lowermost region to its uppermost region. As shown in FIG. 4, the interior surface 114 of the spinner wall 108 is circular cylindrical in shape being concentric about the axis of rotation of the spinner.

The exterior peripheral wall surface 140 of the spinner wall 108 is frusto-conical in shape, the taper or angularity of the surface 140 being inclined downwardly and inwardly toward the spinner axis from the upper edge 148 of the spinner wall to the lower edge 154, the surfaces 114 and 140 being in converging relation. In the construction of the character shown in FIG. 4, the passages 152 from the lower region toward the upper region of the spinner wall are of increasing lengths, there being about twenty or more vertically spaced rows of orifices or glass flow passages 152 in the spinner wall.

The heat or hot gases from the chamber 68 are of a highest temperature at the region of the upper circular edge 148 of the spinner wall and, as the hot gases move downwardly along the spinner wall they lose heat and are progressively reduced in temperature. Thus, the upper region of the spinner wall is at the highest temperature, the ambient temperature along the spinner wall decreasing toward its lower edge region 154.

The glass of the stream 18, directly engaging the floor portion 110 of the spinner, is rapidly moved by centrifugal forces of rotation along the interior surface 114 of the spinner wall, providing a film or layer 18' of glass of substantial thickness throughout the vertical region of the spinner wall 114. As the stream 18 of glass is delivered into the spinner as close as practicable to the spinner wall, the glass of the stream on the bottom or floor portion 110 is in continuous connection with the layer 18' of glass on the spinner wall whereby there is a minimum of heat loss as the glass is maintained in a unitary body.

It is found that the floor of the spinner, being integral with the peripheral wall, functions in effect, as a heat sink by reason of conduction of heat through the spinner wall to the spinner floor. By reason of the spinner floor being at a reduced temperature, the glass of the stream 18 engaging the inner surface of the floor portion 110 of the spinner is chilled or reduced in temperature whereby the glass in contact with the floor portion is of higher viscosity and of reduced mobility.

The glass of the stream which does not come in direct contact with the spinner floor is initially of higher temperature and hence less viscosity and flows more readily toward the upper region of the inner wall of the spinner. Hence, the glass in the upper region on the interior of the spinner, being at a high temperature and of low viscosity, would normally flow rapidly through the upper passages in the spinner wall. To compensate for flow rate of the higher temperature, more fluid glass in the interior upper region, the spinner wall is of increased thickness toward the upper region, this being accomplished by tapering the wall from a comparatively thin section at the lower region of the spinner to a thicker section in the upper region.

The passages through the spinner wall toward the upper region are progressively of greater length by reason of the taper of the spinner wall. Hence, the passages in the spinner wall of increasing length toward the upper edge provide progressively increasing resistance to the flow of the more fluid glass in the upper region. The highest temperature heat from the chamber 68 is adjacent the upper region of the spinner wall, hence the temperature of the spinner wall is highest at this region, exceeding the temperature of the glass flowing through the passages 152 at this region. By reason of the rapid rate of flow of the glass from the spinner through the upper passages, there is no appreciable or significant increase in the temperature of the glass delivered from passages in the thickened portion of the spinner wall.

The uppermost passages 152 being of substantial lengths at the hottest region of the spinner wall provide substantial resistance to flow of the more fluid glass and, due to the progressively reduced lengths of passages toward the lower region of the spinner wall, the flow resistances of the progressively shorter passages 152 provide progressively decreased resistances to glass flow. Through the use of this method and arrangement, the flowing of glass through passages of varying resistances promotes more uniform flow rates of the glass through the passages.

Another environmental factor involved in forming fibers from the streams of glass or primary filaments is the characteristics of the fiber-attenuating gaseous blast. The blast, at its zone of emission from the blower slots 130, is at its highest velocity and, hence, of highest energy for attenuation, the energy of the blast decreasing as it moves downwardly into attenuating engagement with lower streams or primary filaments centrifuged from the spinner.

As the streams or primary filaments of the more fluid glass from the upper passages or orifices in the spinner wall are engaged by the highest energy region of the blast, this high energy provides high attenuating force capable of attenuating more glass into fibers than the energy at lower regions in the blast due to reduce blast velocity. In order to compensate for this greater energy or ability for the blast to attenuate the more fluid glass to fibers, notwithstanding the increased resistance to glass flow of the longer passages, the temperature of the glass is maintained so that a slightly greater amount of glass is flowed through the passages in the upper region of the spinner so that the resulting fibers attenuated with the higher energy of the blast are of substantially the same size or diameters as those fibers attenuated from streams flowing from passages in lower regions attenuated by less energy of the blast. Thus, the compensation in the present method is accomplished by providing slightly greater flow of glass at the upper region of the spinner whereby a greater amount of glass is attenuated by the highest velocity of the attenuating blast resulting in attenuated fibers formed from all of the streams of glass or primaries from the spinner being within a comparatively narrow size range.

The angle of convergence of the interior surface 114 and the exterior surface 140 of the spinner is indicated at A and this angle may be varied to vary or modify the relative lengths of the glass passages 152 and hence vary the glass flow resistances of the passages from the lower region of the spinner wall to the upper region.

The extent of varying resistances of the passages 152 is dependent upon several operating factors such as the height of the spinner wall, the temperature of the glass the amount of heat or hot gases delivered along the spinner wall from the combustion chamber 68, and the characteristics of the attenuating blast.

It is found that the angle A of convergence of the inner and outer spinner wall surfaces may be in a range of from one and one-half degrees to three and one-half degrees, and that for a spinner wall having a height of about two inches from the lowermost to the uppermost passage 152, angle A is preferably about two and one-half degrees with the passages 152 of the uppermost row being of a length approximately twice the length of the passages 152 of the lowermost row. The thickness of the spinner wall at the lower region may be in a range of from one-eighth of an inch to one-quarter of an inch.

The spinner may be of a diameter in a range of from eight inches to fourteen inches or more, it being found that a spinner of an exterior diameter of about twelve inches provided with ten thousand or more orifices or glass flow passages 152 is preferable in carrying out the method of the invention.

The inwardly extending annular flange 112 integral with the upper region of the peripheral wall 108 is of a size to provide sufficient strength to resist the stresses of centrifugal forces and resist distortion of the spinner. Another advantage of a minimum size flange 112 is that conduction of heat from the upper edge of the spinner by the flange is limited so that more heat is conducted downwardly through the metal of the spinner wall 108.

Another factor tending to promote an improved heat environment along the spinner wall resides in guiding the flames or heat from the burner chamber 68 by a surface so that there is no excess heating of the annular flange 112. This arrangement includes a lower or bottom member 156 provided on the inner circular wall 62 of the burner housing, the member 156 being disposed above and adjacent the flange 112 on the spinner and functioning as a shield or baffle to retard transfer of heat or hot gases from the chamber 68 to the flange 112 resulting in more efficient ambient thermal environment at the spinner wall and embracing the glass streams or primary filaments projected from the passages 152. The lower region of the wall 62 is fashioned with a cooling chamber 157 accommodating circulating cooling fluid.

The relationship of the burner or heat applying means with the spinner is important in achieving a more uniform temperature environment at the stream delivery region of the spinner. The heat from the burner directed along the spinner wall provides the highest temperature at the thickened region of the spinner wall adjacent its open end. The heat is conducted from this high temperature region through the spinner wall to the bottom or floor portions of the spinner at the closed end before heat is conducted away through the shaft 84. Heat losses are low, and the conduction of the heat by the spinner wall provides a low gradient along the spinner wall so that the spinner wall temperature tends to be more uniform throughout the length of the wall.

The glass of the film or layer on the spinner wall at the lower regions of the wall is of lesser temperature than that of the glass of the upper region. As the glass of lower temperature at the lower regions of the spinner is delivered through shorter passages 152 through a heated environment of lesser temperature than the heated environment at the upper region of the spinner into a lower energy region of the blast, a lesser amount of glass flows through these passages than those at the upper region of the spinner wall. The lesser amount of glass of the streams or primaries delivered through the lower passages is attenuated to fibers of substantially the same size as the fibers attenuated from the streams of increased flow from the upper passages. This method, in addition to forming fibers of more uniform size or diameters by the rotary process, provides an increasing yield by reason of the greater amount of glass flowed through the upper passages of the spinner and attenuated to a proportionately greater amount of fibers.

The attenuation of the glass streams or primary filaments through the method and apparatus of the invention results in the bulk or substantial quantity of the attenuated fibers being in a comparatively narrow size range or band. Where the glass temperatures are modified, attenuated fibers may be attained of a different average size but the bulk or large proportion of the fibers, irrespective of the average size, may be maintained in a narrow size range. If comparatively fine blast-attenuated fibers are desired, the temperature of the glass may be of about 2000° F. or more and, if the bulk of the fibers of a larger size is desired, the temperature of the glass is reduced.

Another factor promoting an improved thermal environment at the region of delivery of the primary filaments or streams of glass from the passages 152 resides in the provision of an imperforate bottom wall for the spinner as the heat conducted through the spinner wall to the adjacent floor portion 110 provides a heated glass receiving surface so as to further reduce heat losses from the glass in its movement from the initial supply stream to the interior spinner wall.

The method of the invention and the apparatus described for performing the method attain many advantages in the exercise of control of attenuation under conditions fostering the formation of fibers within a narrow size range. Through the elimination of a glass distributor means or distributor basket usually used interiorly of a spinner, the glass supply stream is delivered directly onto the floor or surface of the spinner close to the spinner wall so that the glass, under the influence of centrifugal forces, rapidly traverses the floor of the spinner and flows upwardly providing the layer of hot glass on the inner wall of the spinner.

The glass of the stream, the glass traversing the spinner floor, and the layer of glass on the spinner wall are interconnected or integrated into a single body presenting a minimum of exposed surface area so that heat losses from the glass are greatly reduced with a consequent more uniform higher temperature at the spinner wall. Thus, the glass at the spinner wall is of a higher temperature than when, as heretofore, the glass has been impinged on the spinner wall from a distributor "basket" or cup. As the glass at the spinner wall is of comparatively high temperature, the amount of heat required from the combustion chamber 68 may be reduced to maintain an attenuating environment.

It is found that the volume and velocity of gas providing the attenuating blast may be reduced as the primary filaments or streams of glass are at high temperatures and hence more readily and effectively attenuated by the blast into fibers. A reduction in blast volume and velocity results in less turbulence in the fiberizing zone and fibers produced are increased in length and of high strength by reason of less abrasion occurring among the fibers. Fibers of uniform size and character provide a pack or mat of fibers having improved parting strength and a better insulating factor.

In the present arrangement with the floor of the spinner supported by the shaft 84 and heat applied adjacent the upper edge of the spinner, progressive cooling occurs downwardly from the upper edge region of the spinner. This arrangement provides a thermal differential between the top and bottom regions of the spinner wall by reason of the progressively decreasing thermal gradient downwardly along the spinner wall. In the present invention, the passages or orifices in the spinner wall of varying flow resistances provide the degrees of resistance to flow of the glass in the passages to compensate for the temperature differential or temperature gradient, and the flow passages in the frusto-conically shaped spinner wall, being of varying lengths, provide the varying resistances to accomplish the compensation. Thus, the greater thickness of the spinner wall and hence the longer passages are provided in the region of the wall where the heat is greatest, and the thinner passages providing less flow resistance are in the region of a lower temperature environment.

The variable thickness of the spinner wall tends to provide substantially equal resistance to glass flow throughout the height of the spinner wall with an increased rate of delivery of glass through the upper passages in the spinner wall due to the more fluid or less viscous glass at the upper interior region of the spinner. Hence the invention embraces the incorporation into a spinner configuration of a means of glass flow compensation for the nonuniform temperature of glass along the interior of the spinner wall by providing a greater resistance to glass flow through passages in the spinner wall where the temperature is highest with a resistance pattern of the passages substantially matched to the ambient temperature pattern or environment at the exterior of the spinner wall and the progressive decrease of attenuating energy downwardly of the gaseous blast to thereby result in attenuated fibers of substantially uniform size or within a narrow size range.

Figure 5:
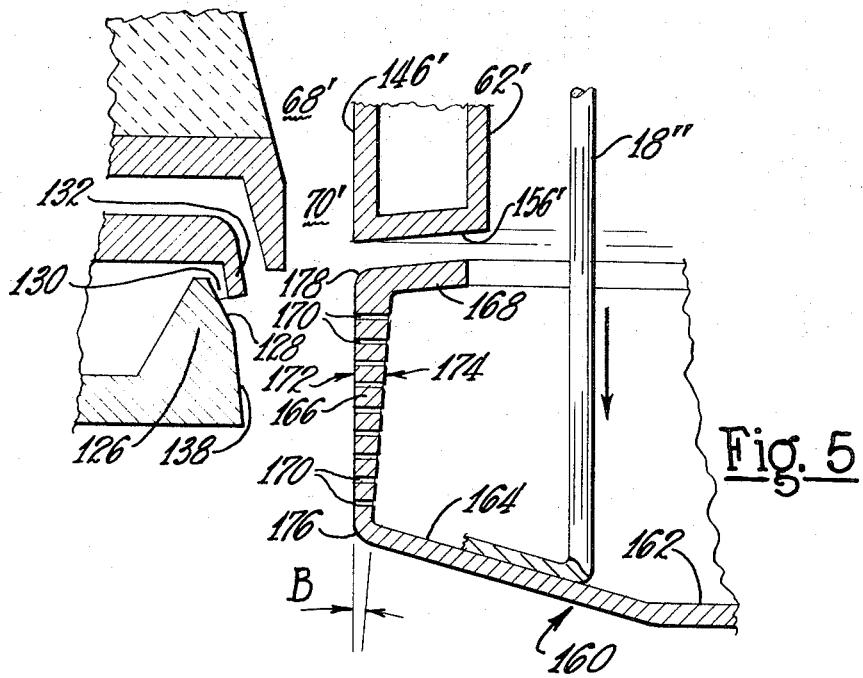
FIG. 5 is a fragmentary sectional view illustrating a modification of the spinner construction.

FIG. 5 illustrates an arrangement wherein the peripheral wall of the spinner is of modified configuration or shape. In this form the hollow spinner 160 is fashioned with an imperforate bottom or floor section 162 fashioned with an upwardly and outwardly angularly disposed or frusto-conically shaped portion 164 integrally joined with a peripheral wall 166 of the spinner, the upper region of the wall terminating in an inwardly extending annular flange 168. The peripheral wall 166 of the spinner is fashioned with flow passages or orifices 170 arranged in vertically spaced rows in the same manner as the orifices 152 shown in FIG. 4.

The glass from the stream 18″ flows along the inner peripheral wall surface 174 of the spinner and is delivered through the flow passages or orifices 170 under the influence of centrifugal forces as streams or primary filaments. In the form shown in FIG. 5, the exterior peripheral wall surface 172 of the spinner is of cylindrical shape, concentric about the axis of rotation of the spinner. The interior wall surface 174 of the spinner is frusto-conically shaped, being tapered upwardly and inwardly from a lower region 176 of the spinner wall to the upper region 178 of the spinner wall.

The angle of convergence of the surfaces 172 and 174, indicated at B, may be in a range of from one and one-half degrees to three and one-half degrees. With a spinner having a peripheral wall of about two inches in height between the lowermost and uppermost flow passages 170 and the angle B of convergence of the surfaces 172 and 174 being about two and one-half degrees, the passages of the uppermost row are of a length of approximately twice the length of the passages in the lowermost row in the spinner wall.

The heat or hot gases delivered from the combustion chamber 68′ through the annular throat 70′ move along the spinner wall surface 172, establishing a heated environment of progressively decreasing temperatures along this surface into which primary filaments or streams of glass are projected by centrifugal forces through the flow passages 170. A shield or baffle member 156′ fashioned on the inner wall 62′ of the combustion burner construction and disposed above and adjacent the flange 168 on the spinner retards transfer of heat from chamber 68′ to the flange 168.

This arrangement prevents excessive heating of the flange 168 with a consequent more efficient use of the heat for the environment embracing the glass streams or primary filaments projected through the flow passages 170. The surface 146′ of the inner wall of the throat 70′ of the burner is in substantial vertical alignment with the upper edge 178 of the spinner wall whereby heat from the burner chamber 68′ is directed along and in contact with the exterior surface 172 of the spinner wall.

Through the provision of passages 170 in the peripheral wall of progressively decreasing lengths from the upper row of passages to the lower row of passages providing varying resistances to glass flow in association with a varying ambient temperature and the delivery of streams of glass from the passages into an attenuating blast, the fibers constituting the bulk or high percentage of the attenuated fibers are of substantially the same diameters or of an average diameter or size within a narrow size range. In further reference to the size range of fiber diameters that may be considered a narrow range or band, by way of example and not by limitation, a narrow size range would embrace fibers of diameters of from eighteen hundred thousandths of an inch to twenty-five hundred thousandths of an inch. As another example, the fibers may be in a narrow range of diameters of twenty-seven hundred thousandths of an inch to thirty-four hundred thousandths of an inch.

The factors hereinbefore mentioned may be varied in the use of the arrangement shown in FIG. 5 to control the characteristics and flow rates of glass of the streams delivered through the passages 170 whereby the fibers attenuated from the streams are of a narrow size range or band, and the factors varied or modified to change the size of the bulk of the attenuated fibers.

It has been found that with the use of the spinner construction of the invention, the wear life of the spinner is greatly prolonged as compared with the wear life of prior spinners having peripheral walls of uniform thickness. In the use of prior spinners, the passages in the upper region were worn or enlarged through use at a much greater rate than the passages in the bottom region of the spinner wall. In the spinner construction of the invention having glass flow passages of varying resistances with the passages of greater resistances at the upper region of the spinner wall, the wear of the passages in the upper region occurs at a greatly reduced rate as compared with the rate of wear of passages in the upper region of a spinner wall of uniform thickness. Thus, the spinner of the present invention has a much longer useful life than a spinner of comparable size having a peripheral wall of uniform thickness.

While the forms of spinner construction are adapted to perform the described method of producing fibers wherein the bulk of fibers are within a comparatively narrow size range, it is to be understood that the cross sectional contour of the inner and outer surfaces of the peripheral wall region of a hollow spinner may be varied to provide various lengths of passages in the spinner wall and thereby vary the flow resistances of the passages 170.

The size of the fibers within a narrow size range or band may be varied, that is, fine fibers may predominate in the bulk, or coarser fibers may be produced constituting the bulk of fibers. The size or proportion of fibers in a desired narrow size range or band may be varied by modifying one or more of the factors hereinbefore described, such as the cross sectional shape or configuration of the spinner wall to change the varying lengths and hence resistances of the flow passages or orifices in the spinner wall, changing the diameter of the passages in the spinner wall, modifying the temperature of the glass delivered into the spinner, regulating the temperature environment or modifying the velocity or other characteristics of the attenuating blast.

Reference has been made herein that the fibers constituting the bulk or a large proportion of the fibers are of diameters within a narrow size range or band. It is found that the fibers of the mass that are of diameters within a narrow size range constitute about forty percent to seventy percent or more of the mass.

The process and apparatus of the invention provide for control of the fibers produced by a fiber-forming unit so that the fibers of the bulk are of diameters within a very narrow size range. In prior rotary methods or processes of producing fibers, many conditions affecting the diameters of the attenuated fibers could not be controlled and fibers produced by such prior processes varied over a wide range of diameters with no uniformity of quality. Hence the products made from such fibers varied widely in their properties, and the products could not be made to conform to a desired standard or specification.

In the use of the present invention where control is exercised over the diameters and character of the fibers, the thermal efficiency, compressibility and strength characteristics of mats or fibrous products are greatly improved and continuous quality of the products can be maintained. For example, the density of mats made of fibers produced according to the invention may be continuously maintained providing a constancy of insulating efficiency or K factor for the fibrous mats. Laminated fibrous products may be successfully produced wherein each fibrous layer may be of fibers of diameters within a different range in diameters and that a high standard of quality of such products may be continuously maintained.

We claim:

1. The method of processing heat-softened fiber-forming material wherein the heat-softened material is fed into a rotating centrifuge with the material of highest temperature flowing toward an upper region including the steps of flowing the heat-softened material through passages of varying lengths in the centrifuge forming streams of the material, and directing heat along the stream delivery region of the centrifuge providing an environment of progressively decreasing temperature downwardly of the centrifuge, the longer passages having higher flow resistances delivering streams of the material of highest temperature from an upper region of the centrifuge and the shorter passage having lower flow resistances delivering streams of the material of lesser temperatures to promote more uniform flow rates of the material from the passages.

2. The method of processing heat-softened fiber-forming material wherein the heat-softened material is fed into a rotating centrifuge having a peripheral wall of varying thickness with the material of highest temperature flowing toward an upper region including the steps of flowing the heat-softened material from the centrifuge through passages in the wall of varying flow resistances forming streams of the material, directing heat along the stream delivery region of the centrifuge providing an environment of progressively decreasing temperature downwardly of the centrifuge, the passages having the higher flow resistances delivering streams of highest temperature from an upper region of the centrifuge and the passages having lower flow resistances delivering streams of the material of lesser temperatures to promote more uniform flow rates of the material from the passages, the flow rates of the material at the higher temperatures delivered through the passages of higher flow resistances being slightly greater than the flow rates of the material delivered from the passages of lower flow resistances.

3. The method of forming fibers of glass including the steps of feeding a stream of heat-softened glass from a supply onto an inner surface of the spinner, rotating the spinner to convey the glass by centrifugal force upwardly along a peripheral wall with the glass of higher temperature flowing toward an upper region of the spinner, delivering the glass through passages of increasing lengths from a lower region to the upper region of the wall to form streams of glass of more uniform flow rates, directing hot gases of combustion toward the exterior of the spinner wall establishing a high ambient temperature at the region of longest passages and progressively reduced ambient temperatures downwardly adjacent passages of decreasing lengths, delivering the streams of glass from the passages into a high velocity gaseous blast, and attenuating the glass of the streams into fibers by the forces of the blast.

4. Apparatus for forming centrifuged bodies of heat-softened material, in combination, a hollow spinner having a floor section and a peripheral wall of varying thickness, said wall having passages of differing flow resistances, the passages at a region of the peripheral wall remote from the floor section having the higher flow resistances, means for delivering heat-softened material from a supply onto the floor section of the spinner, means for rotating said spinner at a speed to project bodies of the heat-softened material from the passages by centrifugal forces, means for applying heat to the exterior of the peripheral wall with the highest temperature of applied heat at the region of the passages of higher flow resistances, the differing flow resistances of the passages controlling the flow rates of the material from the passages.

5. Apparatus for forming centrifuged bodies of glass, in combination, a hollow spinner having a peripheral wall provided with small passages of substantially the same diameter and of varying lengths with the longer passages at the upper region of the wall, said spinner having a floor, means for delivering heat-softened glass into the spinner onto the floor of the means to rotate spinner, said spinner at a speed to project bodies of glass from the passages by centrifugal force, means for applying heat to the exterior of the peripheral wall with the highest temperature of applied heat adjacent the longer passages with a downwardly decreasing temperature gradient, the varying lengths of the passages promoting more uniform flow rate of the glass through all of the passages.

6. Apparatus for forming centrifuged bodies of glass, in combination, a hollow spinner having a floor section and a peripheral wall section, said spinner having an inwardly extending flange at its upper region defining an open end, the peripheral wall section being defined by surfaces in converging relation with the thicker zone of the wall at the upper region, said wall section having a plurality of passages therein for varying lengths with the longer passages in the thicker zone, means for delivering a stream of heat-softened glass from a supply onto the floor section of the spinner at a region close to the means to rotate peripheral wall, said spinner at a speed to project bodies of glass from the passages by centrifugal force, and means for delivering hot gases of combustion downwardly along the peripheral wall with the highest temperature at the upper region of the peripheral wall at the zone of the longer passages with a decreasing temperature gradient at the zone of the shorter passages.

7. Apparatus for forming centrifuged bodies of glass, in combination, a hollow spinner having a bottom section and a peripheral wall section, an inwardly extending flange joined with the upper region of the wall section, the peripheral wall section being defined by surfaces in converging relation with the thicker portion of the wall at the upper region, said wall section having vertically spaced rows of small passages, means for feeding a stream of heat-softened glass onto a surface of the spinner at a region close to the peripheral wall, means to rotate said spinner at a speed to project bodies of glass from the passages by centrifugal force, a combustion burner having an annular combustion chamber adapted to burn a fuel and air mixture, said combustion chamber having an annular throat for the discharge of hot gases of combustion into heat-transferring relation with the exterior surface of the peripheral wall to establish the highest temperature at the region of the upper passages in the wall, and means adjacent the flange on the spinner for shielding the flange from direct heat from the gases of combustion.

8. Apparatus for forming blast-attenuated glass fibers, in combination, a hollow spinner having a peripheral wall area of substantial height provided with vertically spaced rows of small passages, means for rotating the spinner to project streams of glass through the passages by centrifugal forces, means for supplying a stream of heat-softened glass into the hollow spinner close to an interior wall region of the spinner and onto a surface connected with the peripheral wall, said peripheral wall of the spinner having its exterior and interior surfaces in converging relation from the upper region toward the lower region of the wall whereby the passages in the wall are of varying lengths with the longer passages at the upper region, an annular blower manifold surrounding and spaced from the spinner having circumferentially arranged orifice means through which gas is delivered as a high velocity blast into engagement with the streams of glass to attenuate the glass to fibers, means for applying heat adjacent the spinner wall, said heat applying means providing the highest temperature at the upper region of the wall with a progressively decreasing temperature gradient downwardly of the spinner wall.

9. Apparatus for forming blast attenuated glass fibers, in combination, a hollow spinner having a peripheral wall of substantial height provided with vertically spaced rows of small passages, said spinner having an imperforate floor section, said floor section having an outwardly and upwardly inclined annular portion joined with the peripheral wall, means supplying a stream of heat-softened glass into the hollow spinner onto the floor section, means for rotating the spinner to project streams of glass through the small passages by centrifugal forces, said peripheral wall of the spinner having its exterior and interior surfaces in converging relation from the upper region toward the lower region of the wall whereby the passages in the wall are of varying lengths with the longest passages at the upper region of the wall, an annular blower manifold surrounding and spaced from the spinner having circumferentially arranged orifice means through which gas at a temperature less than the temperature of the glass is delivered as a high velocity blast into engagement with the streams of glass to attenuate the glass to fibers, and an annular combustion burner adjacent the peripheral wall of the spinner for delivering the hot gases of combustion downwardly along the spinner wall.

10. Apparatus for forming fibers of heat-softened material, in combination, a hollow spinner having an imperforate bottom section and a peripheral wall, a drive shaft connected with the bottom section, the peripheral wall being defined by surfaces in converging relation with the thinner portion of the wall joined with the imperforate bottom section, said peripheral wall having stream flow passages of varying lengths with the longer passages in the thicker portion of the wall, means for applying heat to the region of the spinner wall with the highest temperature at the thicker portion of the wall, the heat being conducted through the wall and the bottom section to the shaft providing a low temperature gradient along the wall, means for delivering heat-softened material onto the imperforate bottom section of the spinner, means to rotate said spinner to project streams of the material from the passages by centrifugal force, and means delivering an attenuating blast into engagement with the streams for attenuating the streams to fibers.

11. Apparatus for forming fibers of heat-softened material including, in combination, a hollow spinner having an imperforate bottom section and a peripheral wall, said bottom section having an outwardly and upwardly inclined annular portion joined with the wall, a drive shaft connected with the bottom section, the peripheral wall being defined by surfaces in converging relation with the thinner portion of the wall at its juncture with the inclined annular portion of the imperforate bottom section, said peripheral wall having stream flow passages of varying lengths with the longer passages in the thicker portion of the wall, means for applying heat to the region of the spinner wall with the highest temperature at the thicker portion of the wall, the heat being conducted through the wall and the bottom section to the shaft providing a low temperature gradient along the wall, means for delivering heat-softened material onto the imperforate bottom section of the spinner, means to rotate said spinner to project streams of the material from the passages by centrifugal force, and means delivering an attenuating blast into engagement with the streams for attenuating the streams to fibers, the varying lengths of the passages providing flow rates of the streams of material resulting in attenuated fibers of diameters within a narrow size range.

12. The method of processing heat-softened material wherein the heat-softened material is fed into a centrifuge having an imperforate end and a peripheral wall of varying thickness with the thickest portion remote from the imperforate end including applying heat to the centrifuge wall with the greatest heating effect at the thickest region of the wall, conducting the heat through the wall and the imperforate end to establish a low temperature gradient along the wall, rotating the centrifuge to flow streams of the material through stream flow passages of differing lengths in the peripheral wall, engaging the streams with a gaseous blast, and attenuating the streams by forces of the blast to fibers of diameters within a narrow size range.

References Cited

UNITED STATES PATENTS

| 3,026,563 | 3/1962 | Slayter et al. | 65—14 |
| 3,304,164 | 2/1967 | Charpentier et al. | 65—6 X |
| 3,357,807 | 12/1967 | Stalego | 65—6 |

FOREIGN PATENTS

| 641,809 | 5/1962 | Canada | 65—6 |

ROBERT L. LINDSAY, JR., Primary Examiner

U.S. Cl. X.R.

65—14